United States Patent
VanderWilt et al.

(10) Patent No.: US 9,254,728 B2
(45) Date of Patent: Feb. 9, 2016

(54) SUSPENSION SYSTEM WITH A FLOATING AXLE LOCK

(75) Inventors: Thomas J. VanderWilt, Lynden, WA (US); Kenneth J. Buist, Lynden, WA (US)

(73) Assignee: Oxbo International Corporation, Byron, NY (US)

( * ) Notice: Subject to any disclaimer, the term of this patent is extended or adjusted under 35 U.S.C. 154(b) by 0 days.

(21) Appl. No.: 12/121,622

(22) Filed: May 15, 2008

(65) Prior Publication Data

US 2015/0239316 A1    Aug. 27, 2015

(51) Int. Cl.
*B60G 17/005* (2006.01)
*B60G 17/016* (2006.01)
*B60G 17/019* (2006.01)
*B60G 21/10* (2006.01)

(52) U.S. Cl.
CPC ............ *B60G 17/005* (2013.01); *B60G 17/016* (2013.01); *B60G 17/019* (2013.01); *B60G 21/106* (2013.01)

(58) Field of Classification Search
CPC .. B60G 17/005; B60G 17/016; B60G 17/019; B60G 21/106
See application file for complete search history.

(56) References Cited

U.S. PATENT DOCUMENTS

| | | |
|---|---|---|
| 3,976,302 A | 8/1976 | Hammarstrand |
| 4,236,591 A | 12/1980 | Molby |
| 4,247,126 A | 1/1981 | Claxton |
| 4,483,552 A | 11/1984 | Dorscht |
| 4,512,589 A | 4/1985 | Ambrose et al. |
| 4,597,584 A | 7/1986 | Hanser |
| 4,696,152 A | 9/1987 | Kinzenbaw |
| 5,143,386 A | 9/1992 | Uriarte |
| 5,383,680 A * | 1/1995 | Bock et al. ................ 280/5.503 |
| 5,447,331 A | 9/1995 | Barnhart |
| 5,538,266 A | 7/1996 | Martin et al. |
| 5,684,698 A | 11/1997 | Fujii et al. |
| 5,709,394 A | 1/1998 | Martin et al. |
| 5,857,823 A | 1/1999 | MacEachern |
| 5,918,448 A | 7/1999 | Wheeler |
| 6,131,919 A | 10/2000 | Lee et al. |
| 6,168,171 B1 | 1/2001 | Shono et al. |
| 6,196,555 B1 | 3/2001 | Gaibler |
| 6,199,769 B1 | 3/2001 | Weddle |
| 6,273,203 B1 | 8/2001 | Paggi et al. |
| 6,386,554 B1 | 5/2002 | Weddle |
| 6,416,061 B1 * | 7/2002 | French et al. ............... 280/5.514 |
| 6,470,248 B2 | 10/2002 | Shank et al. |
| 6,698,478 B2 | 3/2004 | Nault |
| 6,768,936 B2 | 7/2004 | Fiorletta et al. |
| 6,848,693 B2 | 2/2005 | Schneider |

(Continued)

*Primary Examiner* — Drew Brown
(74) *Attorney, Agent, or Firm* — Merchant & Gould P.C.

(57) ABSTRACT

A suspension system for a vehicle includes a right front wheel, a left front wheel, a right rear wheel and a left rear wheel. A suspension system for the vehicle includes a first cylinder supporting the vehicle at the right front wheel in fluid communication with a second cylinder supporting the vehicle at the left front wheel, wherein the first and second cylinders form a virtual articulated front axle. The suspension system also includes a third cylinder supporting the vehicle at the right rear wheel and a fourth cylinder supporting the vehicle at the left rear wheel. The suspension system includes two spool valves in fluid communication with the first and second cylinders and intermediate the first and second cylinders. When one of the rear wheels is unweighted, an associate one of the spool valves closes and fluid flow between the first and second cylinders is blocked to create a virtual locked axle.

25 Claims, 5 Drawing Sheets

(56) References Cited

U.S. PATENT DOCUMENTS

| | | |
|---|---|---|
| 6,923,453 B2 | 8/2005 | Pivac |
| 7,020,551 B2 | 3/2006 | Goebels et al. |
| 7,055,831 B2 | 6/2006 | Brandenburger |
| 7,073,316 B2 | 7/2006 | Resing et al. |
| 2002/0035423 A1 | 3/2002 | Shank et al. |
| 2003/0094316 A1 | 5/2003 | Schneider |
| 2004/0049330 A1 | 3/2004 | Fiorletta et al. |
| 2004/0255563 A1 | 12/2004 | Schafer |
| 2005/0252699 A1 | 11/2005 | Schedgick et al. |
| 2007/0073461 A1 | 3/2007 | Fielder |
| 2007/0192002 A1 | 8/2007 | Iyoda |
| 2010/0204886 A1* | 8/2010 | Fitzgibbons ............... 701/38 |
| 2012/0205182 A1* | 8/2012 | Rindfleisch ............... 180/338 |
| 2014/0312580 A1* | 10/2014 | Gale ............... 280/5.509 |

* cited by examiner

SUSPENSION SYSTEM WITH A FLOATING AXLE LOCK

BACKGROUND OF THE INVENTION

1. Field of the Invention

The present invention relates to a vehicle and suspension system with an automatically locking front floating axle that locks when it detects that one of the rear wheels is unweighted and is directed to a control system for such a suspension.

2. Description of the Prior Art

Wheeled vehicles that operate on a slope and especially those that work on side slopes may require adjustable suspensions that reposition the vehicle frame with respect to the ground to maintain a level orientation. Such systems provide height adjustment while increasing stability and maintaining the vehicle at a substantially level operating orientation. Many types of agricultural vehicles such as over the row harvesters with a relatively high center of gravity require such adjustable suspension systems.

Systems are known that utilize hydraulic cylinders to maintain the vehicle at a level orientation for improved positioning relative to plants being treated or harvested. Typical prior art systems may have front and rear hydraulic cylinders that are interconnected to form a master/slave system. Systems are known that use interconnected front wheels or rear wheels to simulate a floating axle. Such systems shift fluid back and forth to extend and simultaneously retract opposed hydraulic cylinders at the front or rear to level the vehicle. Although such hydraulic suspension systems generally provide for a ride with improved leveling, such systems may suffer from lack of responsiveness or overcorrection in certain situations. Therefore, such vehicles may are subject to tipping over, especially when working on a hillside or when a hole is encountered by one of the wheels.

A system is needed that provides for large coverage to maintain stability when the center of gravity of the vehicle is over the supported area formed by the support points of the vehicle. Under various operating conditions with a floating axle, the suspension system has support points that change. An improved hydraulic suspension system would provide stable correction with a stability area that overlaps as it shifts and is not vulnerable to tipping over. Such a suspension system should also have the advantages of a floating axle to maintain a level operating orientation. Such a system should also be simple and reliable. The present invention addresses these as well as other problems associated with hydraulic suspension systems for vehicles operating on slopes.

SUMMARY OF THE INVENTION

The present invention is directed to a harvester and a hydraulic suspension system for a harvester that provides greater stability and improved ride. In particular, the present invention uses a hydraulic suspension system for a harvester that simulates a floating front axle that is automatically lockable to provide improved stability.

In one embodiment, the harvester vehicle is a harvester such as an over-the-row harvester. Such vehicles have a relatively high center of gravity and may travel on uneven terrain such as across the slopes of hills where stability and tipping are concerns. The suspension system for the vehicle is a hydraulic system with an extendable cylinder associated with each of the four wheels of the vehicle. The hydraulic cylinders may be extended or retracted to raise or lower the vehicle. In addition, the cylinders on one side are raised or lowered together to maintain the cab and chassis at a level orientation when traversing sides of hills. The front and rear hydraulic cylinder on each side of the vehicle are in a master-slave relationship with the rear cylinders extending and retracting so as to follow the front cylinders.

The front wheels are supported on hydraulic cylinders of the suspension system that are arranged and connected in parallel and simulate a virtual floating axle. When one of the front hydraulic cylinders extends, the other retracts in an equal and opposite amount due to the hydraulic fluid flow between the front cylinders. The fluid flow may also be locked so that the virtual front axle does not float. The floating axle provides improvements for ride and suspension while the locked axle generally provides a wider and more stable support base for the vehicle having four support points.

The present suspension system uses a spool valve associated with each rear hydraulic support cylinder. The spool valve has a sliding spool that blocks flow in an actuated position and a spring opens the valve when not actuated. When the spring force is overcome by hydraulic fluid pressure, the spool slides and the valve closes and flow stops. When both valves are in the open position, fluid flows freely between the front hydraulic cylinders and the virtual front axle behaves as a floating axle. When either of the valves is actuated, the parallel circuit between the front hydraulic cylinders is broken and the virtual front axle becomes a locked front axle.

With a locked virtual front axle, the vehicle is supported on all four wheels and provides a rectangular base of support that is stable as long as the center of gravity falls within the rectangle form by the four wheels. When the virtual front axle is in a floating mode, the stability base forms a triangle formed by the rear wheels of the vehicle and by the virtual pivot of the front axle intermediate the front wheels. As long as the center of gravity is maintained within this stability triangle, the vehicle is stable and will not tip. This is a normal operating condition and is achieved as long as neither of the spool valves associated with the rear cylinders are actuated.

Should the vehicle encounter uneven terrain and begin to tip, in a conventional hydraulic suspension system, the floating axle may pivot further and the vehicle tips. The vehicle operator may not be able to correct such a situation. However, with the present suspension system, when the vehicle begins to tip, one of the rear wheels may no longer support the vehicle. As this happens, the fluid pressure from the associated cylinder to the associated spool valve stops and the valve changes to its actuated mode wherein it is closed. When one of the spool valves closes and blocks fluid flow, the parallel circuit between the front support cylinders ends is broken and the virtual front axle is no longer floating and becomes a locked front axle. As the vehicle tips, the center of gravity also shifts to the lower side to which the vehicle is tipping. However, when the opposite rear hydraulic cylinder becomes unweighted and the front axle locks, a new virtual support zone is created as the vehicle is supported on a locked front axle rather than a virtual pivot. A triangle support zone is formed by the two front wheels and the still weighted rear wheel. This zone overlaps the triangle of the normal operating position and extends to the side to which the center of gravity shifts. Therefore, the vehicle remains stable and will not tip. The center of gravity is always maintained in a zone of stability with this configuration as the suspension system provides a support zone that changes and overlaps automatically if tipping begins.

The suspension system provides the advantages of a floating front axle as well as the stability provided with a locked front axle and provides the switch between the different modes automatically while maintaining stability.

These features of novelty and various other advantages that characterize the invention are pointed out with particularity in the claims annexed hereto and forming a part hereof. However, for a better understanding of the invention, its advantages, and the objects obtained by its use, reference should be made to the drawings that form a further part hereof, and to the accompanying descriptive matter, in which there is illustrated and described a preferred embodiment of the invention.

BRIEF DESCRIPTION OF THE DRAWINGS

Referring now to the drawings, wherein like reference numerals and letters indicate corresponding structure throughout the several views.

DETAILED DESCRIPTION OF THE PREFERRED EMBODIMENT

Figure 1:
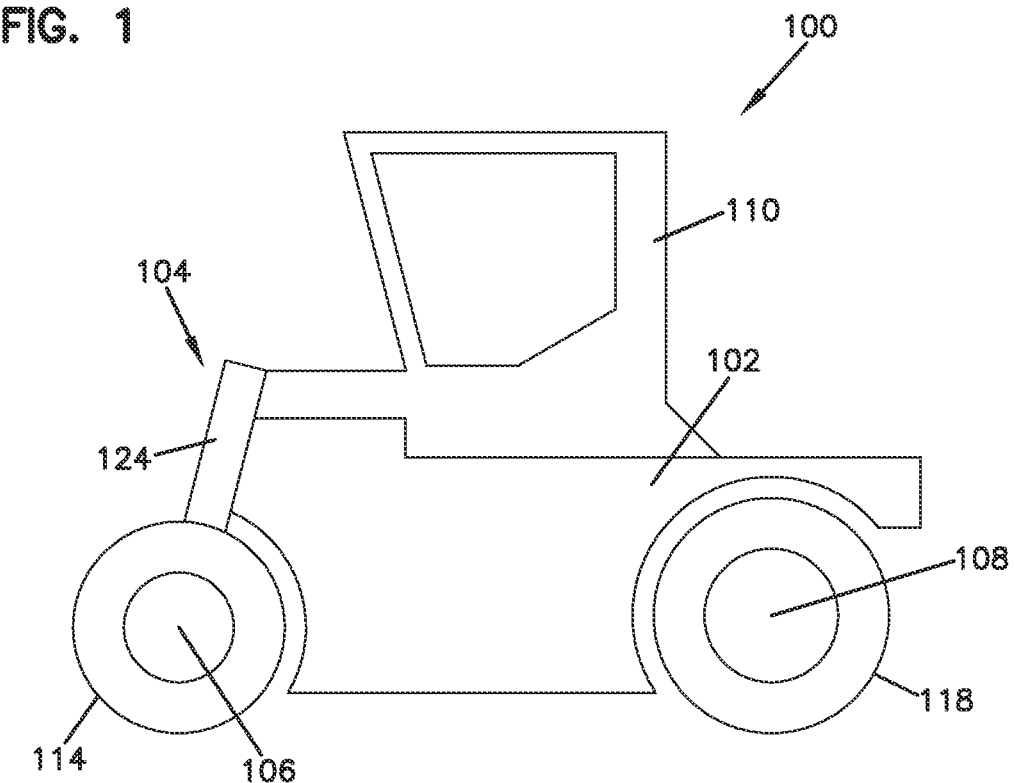
FIG. 1 is a side diagrammatic view of a vehicle with a hydraulic suspension system.
Figure 2:
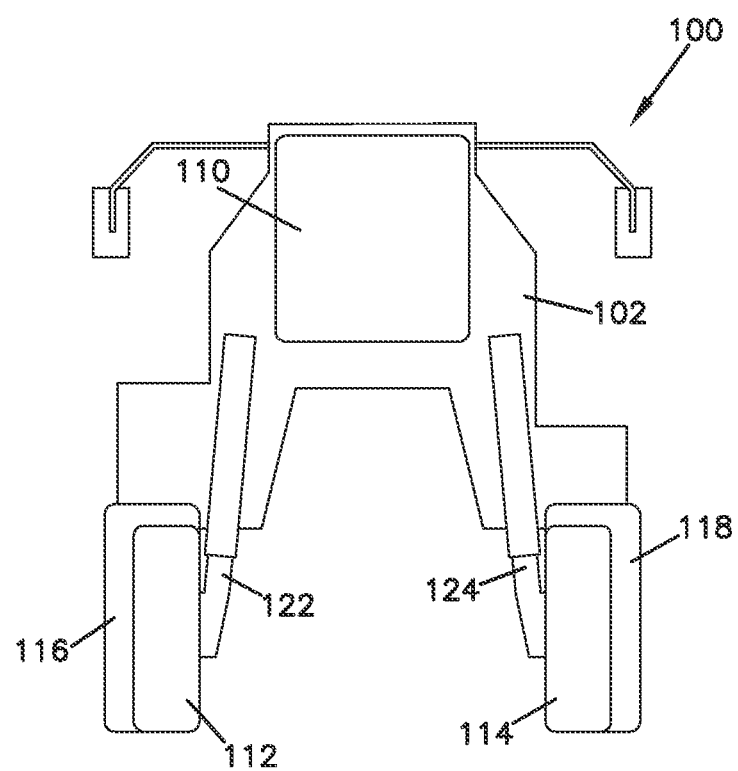
FIG. 2 is an end view of the vehicle shown in FIG. 1 on level ground.

Referring now to the drawings and in particular to FIG. 1, there is shown a harvester vehicle, generally designated 100. The harvester vehicle 100 generally includes a chassis 102 and is configured as an over the row type harvester as is more clearly shown in FIGS. 2 and 3. However, one of ordinary skill in the art would readily understand that other vehicle configurations could also be used. The harvester includes a cab 110 and a drive for the harvester 100. The front wheels 112 and 114 define a virtual front axle 106 while the rear wheels 116 and 118 define a virtual rear axle 108. It can be appreciated that if the vehicle 100 is configured as an over the row type harvester vehicle, it is not possible to have actual axles that extend between the associated left and right wheels. However, the hydraulic suspension system 104 provides a variable system that responds as either a locked front axle or floating front axle wherein the front wheels 112 and 114 raise and lower as if connected on an axle pivoting about a center pivot.

Figure 3:
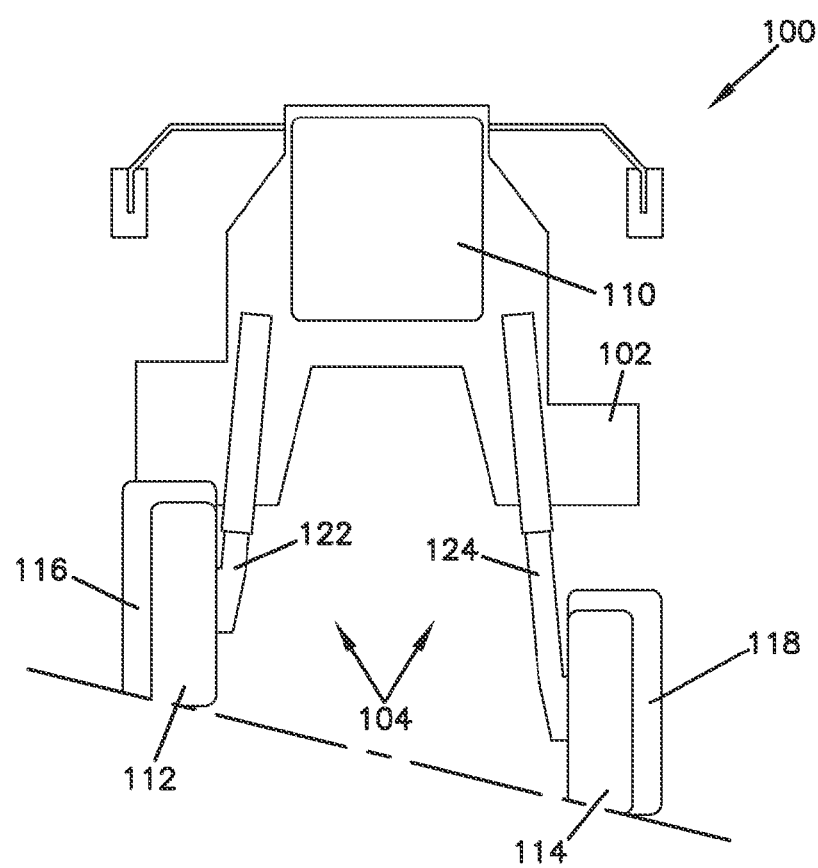
FIG. 3 is an end view of the vehicle shown in FIG. 2 moving along a side of a hill.

The suspension system provides for raising and lowering the entire chassis 102 depending on the needs of the operation being performed, the terrain and the crop being harvested. It can be appreciated that the harvester 100 may travel along the sides of hills, as shown in FIG. 3. In such situations, the wheels must be raised or lowered relative to the frame 102 on at least one side of the vehicle to provide leveling and prevent the vehicle 100 from tipping over. As shown in FIG. 3, the left side of the vehicle is raised relative to the right side of the vehicle, thereby maintaining the cab 110 and chassis 102 at a substantially level horizontal position on the side of the slope. To maintain the harvester 100 at this level horizontal position, telescoping hydraulic cylinders 124 and 128 on the left side of the vehicle are extended while corresponding hydraulic cylinders 122 and 126 on the right side of the vehicle 100 are retracted. When the harvester is traversing sideways on a hill with the right side of the vehicle on the downhill slope, the position is reversed from that shown in FIG. 3 and hydraulic cylinders 122 and 126 are extended while hydraulic cylinders 124 and 128 are retracted.

Figure 4:
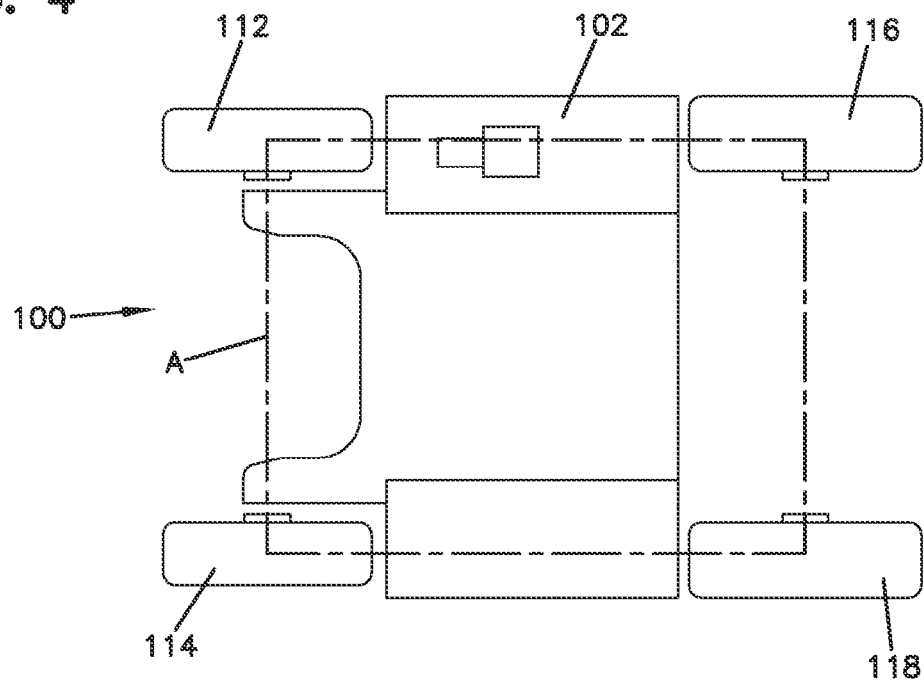
FIG. 4 is a diagrammatic top view of a vehicle and suspension system having a virtual front with a stability diagram overlaid on the vehicle axle locked according to the principles of the present invention.

Referring to FIGS. 4-7, the stability and support of the harvester vehicle 100 varies as the suspension system 104 is configured for different harvester orientations and situations. As shown in FIG. 4, when the suspension system 104 is locked and the hydraulic cylinders 122 and 124 associated with each front wheel cannot extend or retract, the suspension system 104 is substantially locked and the vehicle 104 is supported on all four wheels in a rectangular configuration as represented by stability rectangle A of FIG. 4. As long as the center of gravity of the vehicle 100 remains within the rectangular support area A, the vehicle 100 is stable and will not tip.

Figure 5:
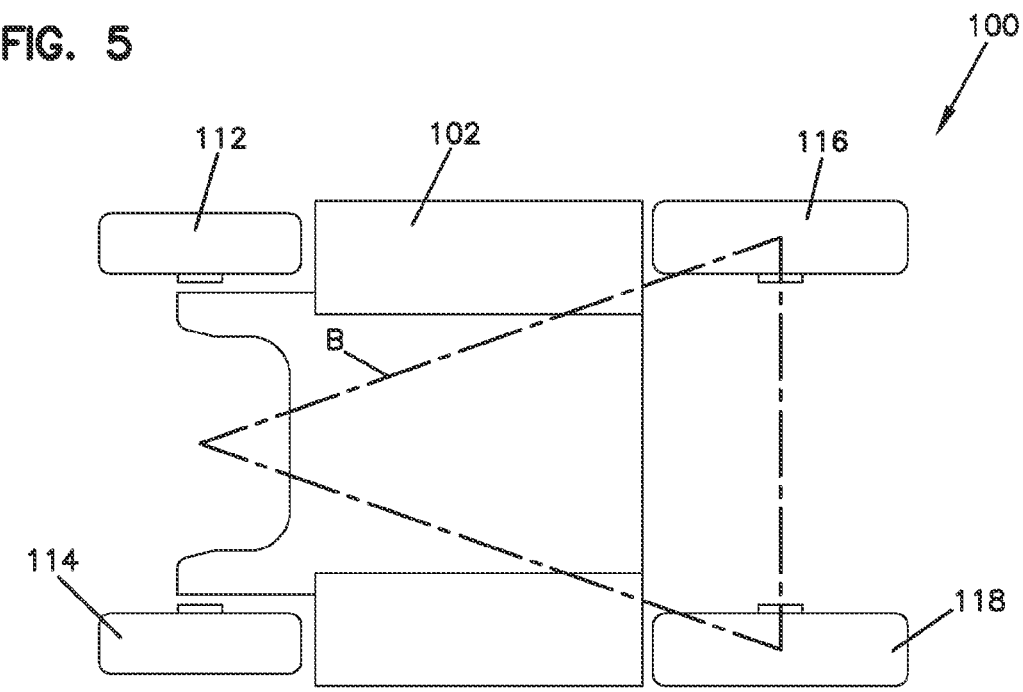
FIG. 5 is a diagrammatic top view of the vehicle and suspension system shown in FIG. 4 with a floating front axle with a stability diagram overlaid on the vehicle.

As shown in FIG. 5, to provide improved ride and to accommodate uneven terrain, the virtual front axle 106 is normally in a floating mode. The virtual floating front axle 106 performs as if there were a central pivot point intermediate the front wheels 112 and 114. One of the hydraulic cylinders 122 or 124 extends while the other retracts in response to uneven terrain. When the suspension 104 is configured so that the virtual front axle 100 floats, the stability diagram is triangular as shown at B in FIG. 5. In the normal operating mode, the virtual front axle 106 floats. The vehicle 100 will remain stable as long as the center of gravity does not fall outside of the stability base B formed by the virtual pivot and the rear wheels.

It can be appreciated that prior suspension systems with a floating front axle would become unstable and may tip over if the center of gravity falls outside of the triangle B shown in FIG. 5. Such systems would become unstable when the floating front axle could not extend the proper cylinder quickly enough. In other situations, the front axle may retract the wrong hydraulic cylinder, compounding the tipping.

The present suspension system 104 provides for floating the virtual front axle 106 during normal operation while also providing the larger support base of a locked front axle.

Figure 6:
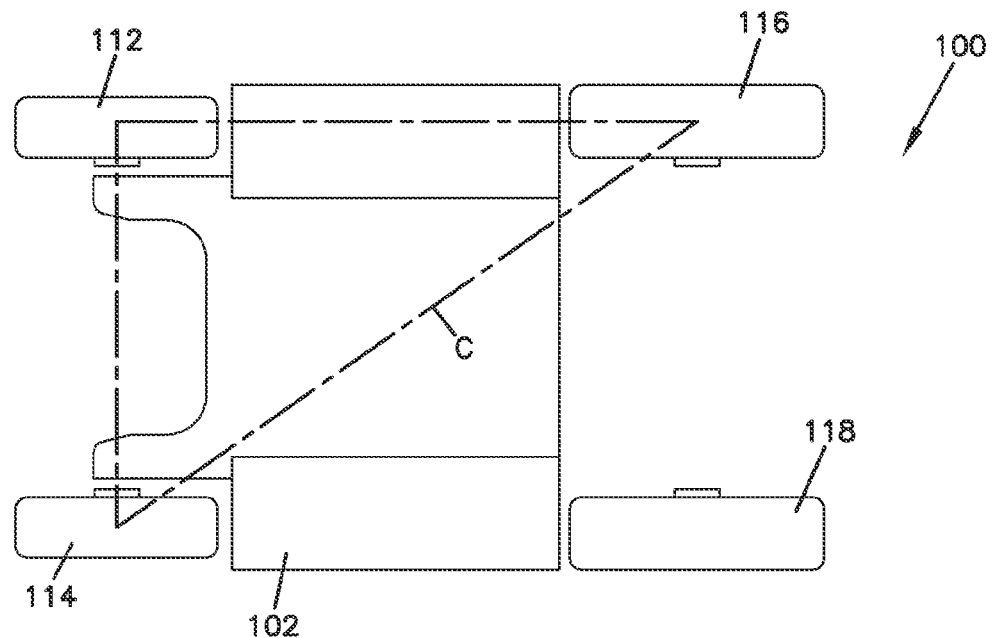
FIG. 6 is a diagrammatic top view of the vehicle and suspension system shown in FIG. 4 with a stability diagram overlaid on the vehicle when no weight detected in a first rear wheel.
Figure 7:
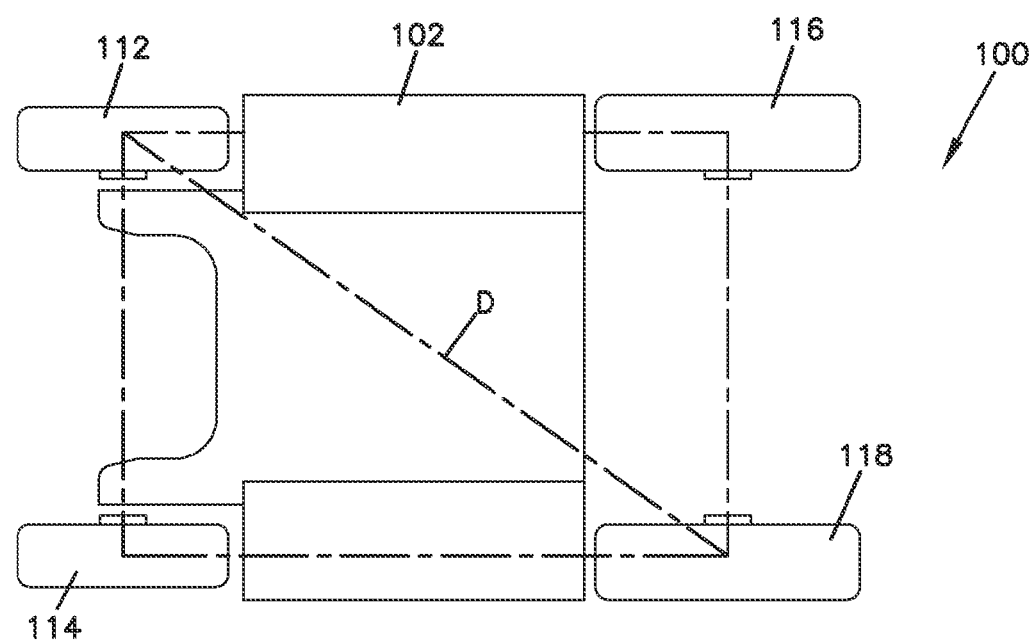
FIG. 7 is a diagrammatic top view of the vehicle and suspension system shown in FIG. 4 with a stability diagram overlaid on the vehicle when no weight detected in a second rear wheel.

As shown in FIGS. 6 and 7, the present suspension system 104 provides for locking of the virtual front axle 106 if there is a decrease in weight to below a predetermined level, or no weight on one of the rear wheels 116 or 118. In such a situation, the front virtual front axle 106 locks and the stability diagram for the harvester 100 changes from stability triangle B as shown in FIG. 5 to stability triangle C shown in FIG. 6 when there is no weight on the left rear wheel. Similarly, when there is no weight on the right rear wheel 116, the stability diagram changes from stability triangle B shown in FIG. 5 to stability triangle D shown in FIG. 7. It can be appreciated that stability triangles C and D provide a base that accommodates movement of the center of gravity as it shifts, as would occur if one of the rear wheels is no longer supporting the vehicle 100. The present suspension system 104 also returns to a floating virtual front axle once there is weight on both rear wheels 116 and 118 and the support base B is again achieved. It can be appreciated that when both rear wheels have weight on them, the center of gravity is shifted to a position within the stability triangle B shown in FIG. 5.

Figure 8:
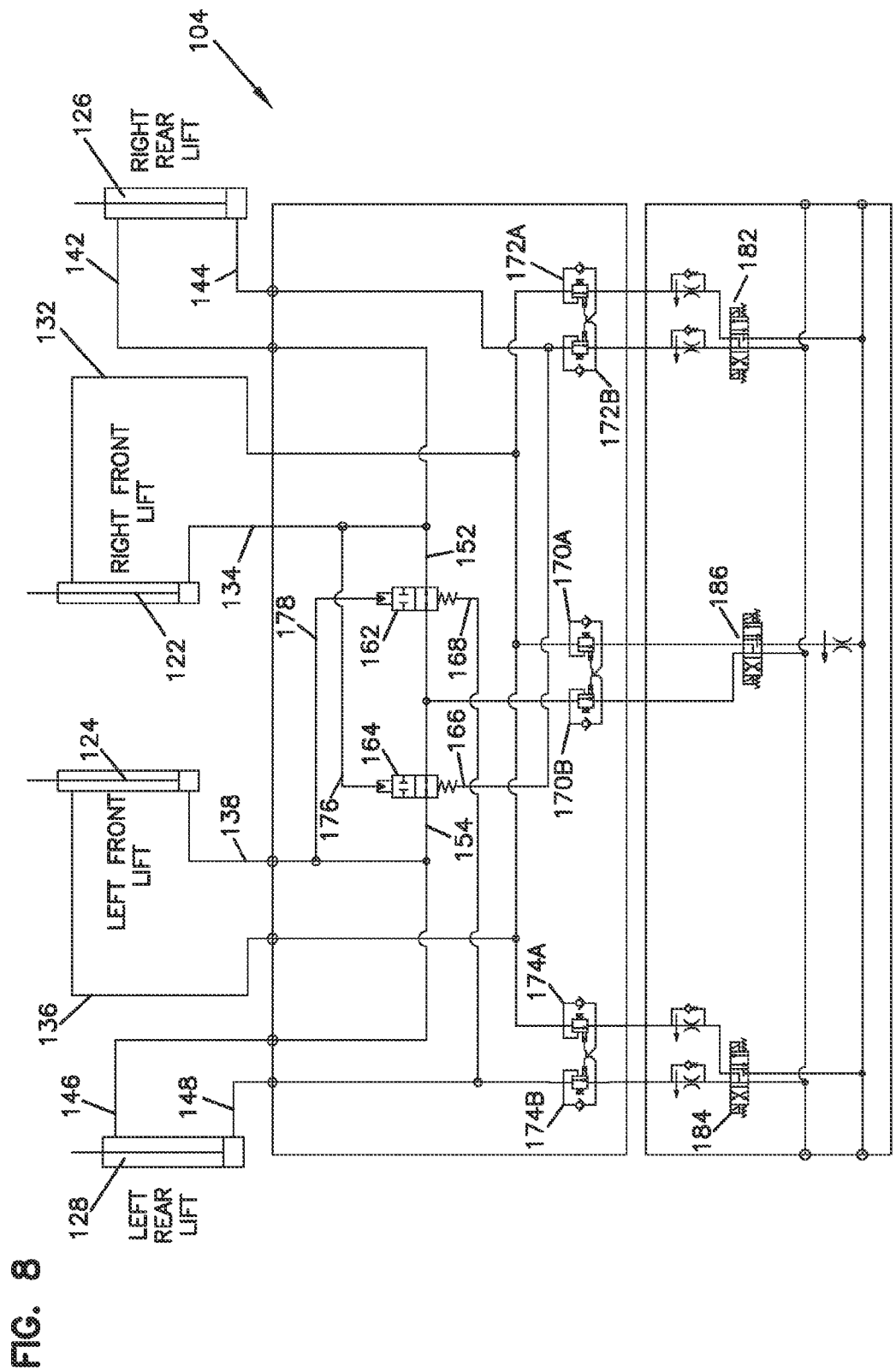
FIG. 8 is a diagrammatic view of the control system for the suspension system shown in FIG. 1.

Referring now to FIG. 8, there is shown a flow diagram for the suspension system 104. The suspension system 104 includes four extendible hydraulic cylinders 122, 124, 126 and 128. Hydraulic cylinder 122 is mounted at the right front wheel 112. Hydraulic cylinder 124 is mounted at the left front wheel 114. Hydraulic cylinder 126 is mounted at the right rear wheel 116 and hydraulic cylinder 128 is mounted at the left rear wheel 118. Hydraulic lines 132 and 134 extend from opposite ends of the cylinder 122. When hydraulic fluid is increased through line 132, the cylinder 122 retracts. When hydraulic fluid is increased through line 134, the hydraulic cylinder 122 extends. Similarly, the left front hydraulic cylinder 124 includes hydraulic lines 136 and 138 and behaves in a same manner.

The right rear hydraulic cylinder 126 includes hydraulic lines 142 and 144. When hydraulic pressure is increased through line 142, the right rear cylinder retracts. When hydraulic pressure through line 144 increases, the right rear cylinder 126 extends. Similarly, the left rear cylinder 128 includes hydraulic lines 146 and 148 and operates in the same manner. The suspension system also includes control valves 172A and 172B on the right side of the vehicle 100, control valves 174A and 174B for the side of the vehicle that act as load holding valves to prevent the machine from drifting down. The entire height of the vehicle 100 can be increased or decreased by control valves 172A, 172B, 174A and 174B. Valves 170A and 170B actuate to raise and lower the front wheels in case of tilting. The entire vehicle 100 can be raised or lowered by extending or retracting all support cylinders 122, 124, 126 and 128. Even when one side is extended more than the other, the vehicle 100 may be raised or lowered. The suspension system 104 includes servo valves 180, 182 and 184 that control the speed and flow to ensure smooth extension and refraction and prevent a sudden shift of the vehicle 100.

With the suspension system 104, the respective front and rear cylinder pairs 122-126 and 124-128 for each side are in a master-slave relationship with the front cylinders 122 and 124 controlling the respective rear cylinders 126 and 128. The front and rear cylinders 122-126 and 124-128 are connected in series so that a side of the vehicle 100 may be raised or lowered together to achieve configurations such as shown in FIG. 3 by adjusting one of the cylinders 122 or 124. The front cylinders 124 and 122 are connected in parallel and define a floating front axle in normal operation. Fluid lines 152 and 154 flow through and are connected to fluid line 150 through pilot valves 162 and 164. The valves 162 and 164 are spool type valves that are biased so as to be normally open. In normal operation, there is weight on the rear wheels 116 and 118 and therefore on the rear cylinders 126 and 128. Therefore, hydraulic pressure is applied through fluid lines 166 and 168 to the spool in each respective valve 162 and 164. When there is force on the rear wheels, the fluid lines 166 and 168 deliver hydraulic pressure to the valves 162 and 164 and the inlet remains open. In this situation, the virtual front axle 106 is a floating axle and the suspension system 104 behaves with a stability diagram B as shown in FIG. 5. When the vehicle 100 begins to tip such that there is no pressure on at least one of the rear wheels, the hydraulic pressure to one of the valves 162 or 164 drops. Therefore, when the pressure drops relative to the fluid pressure of lines 176 and 178, the valve 162 or 164 shifts to its actuated position and closes the inlet port. This blocks the parallel connection between the left and right front cylinders 122 and 124 and the virtual front axle 106 is locked automatically. When the left rear cylinder 128 has no pressure acting on it, the fluid pressure in line 148 drops and the valve 162 closes. In this position, the suspension system 104 has a triangular stability base shifted toward the front axle, which is locked and away from the unweighted wheel 116 as shown in FIG. 6 with stability triangle C. In a similar manner, when the pressure in hydraulic line 144 drops, the force to the pilot spool valve 164 drops. When the fluid pressure relative to the pressure in line 176 drops, the valve 164 closes and the inlet is closed. Under these conditions, the virtual floating front axle 100 is a locked axle and the support configuration shifts to that shown in FIG. 7 and stability triangle D.

When both of the rear wheels 116 and 118 again have pressure, the hydraulic force to valve 162 or 164 again increases relative to the pressure in lines 176 and 178, the valve 162 or 164 opens and the virtual front axle 106 becomes a floating axle. When the front axle 106 becomes a floating axle, the suspension behaves with a stability base as shown in FIG. 5 and stability triangle C.

It can be appreciated that with the suspension system 104, the stability triangles B, C and D are overlapping. Therefore, as the vehicle 100 begins to tip, the center of gravity moves to a position within one of the stability frames as the vehicle 100 is tipping and therefore prevented from tipping further. The center of gravity never passes outside a stable supported zone. The suspension system 104 provides the ride and performance of a floating front axle while providing the stability of a locked front axle with a simple and reliable suspension system.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A suspension system for a vehicle having a right front wheel, a left front wheel, a right rear wheel and a left rear wheel; the system comprising:
   a first cylinder supporting the vehicle at the right front wheel in fluid communication with a second cylinder supporting the vehicle at the left front wheel, wherein the first and second cylinders form a virtual articulated front axle;
   a third cylinder supporting the vehicle at the right rear wheel and a fourth cylinder supporting the vehicle at the left rear wheel;
   at least one locking valve in fluid communication with the first and second cylinders and intermediate the first and second cylinders; and
   a sensor associated with the rear wheels sensing whether weight is on the wheels, wherein the sensor closes the locking valve when the sensor senses that there is a substantial decrease in weight on one of the rear wheels.

2. A suspension system according to claim 1, wherein the locking valve a spool valve.

3. A suspension system according to claim 1, wherein the sensor comprises a spring in the spool valve.

4. A suspension system according to claim 1, wherein the first and third cylinders are extended and refracted independently of the second and fourth cylinders.

5. A suspension system according to claim 1, wherein upon closing the locking valve, the virtual articulated front axle behaves as a virtual locked front axle.

6. A suspension system according to claim 1, wherein the locking valves comprise spool valves biased to a closed position when not actuated.

7. A suspension system according to claim 1, wherein the spool valve is biased toward an open position when not actuated.

8. A suspension system for a vehicle, a right first wheel, a left first wheel, a right second wheel and a left second wheel; the system comprising:
- a first cylinder supporting the vehicle at the right first wheel in fluid communication with a second cylinder supporting the vehicle at the left first wheel, wherein the first and second cylinders form a virtual articulated first axle;
- a third cylinder supporting the vehicle at the right second wheel and a fourth cylinder supporting the vehicle at the left second wheel;
- one or more locking valves in fluid communication with the first and second cylinders and intermediate the first and second cylinders; and
- a sensor associated with the second wheels sensing whether weight is on the wheels, wherein the sensor closes the locking valve when the sensor senses that there is no weight on one of the second wheels.

9. A suspension system according to claim 8, wherein the locking valve a spool valve.

10. A suspension system according to claim 8, wherein the sensor comprises a spring in the spool valve.

11. A suspension system according to claim 8, wherein the first and third cylinders are extended and refracted independently of the second and fourth cylinders.

12. A suspension system according to claim 8, wherein upon closing the locking valve, the virtual articulated front axle behaves as a virtual locked front axle.

13. A suspension system according to claim 8, wherein the locking valves comprise spool valves biased to an open position when not actuated.

14. A vehicle, comprising:
- a right front wheel, a left front wheel, a right rear wheel and a left rear wheel;
- a suspension system comprising:
  - a first cylinder supporting the vehicle at the right front wheel in fluid communication with a second cylinder supporting the vehicle at the left front wheel, wherein the first and second cylinders form a virtual articulated front axle;
  - a third cylinder supporting the vehicle at the right rear wheel and a fourth cylinder supporting the vehicle at the left rear wheel;
  - a locking valve in fluid communication with the first and second cylinders and intermediate the first and second cylinders; and
  - a sensor associated with the rear wheels sensing whether weight is on the wheels, wherein the sensor closes the locking valve when the sensor senses that there is no weight on one of the rear wheels.

15. A vehicle according to claim 14, wherein the locking valve a spool valve.

16. A vehicle according to claim 14, wherein the sensor comprises a spring in the spool valve.

17. A vehicle according to claim 14, wherein the first and third cylinders are extended and retracted independently of the second and fourth cylinders.

18. A vehicle according to claim 14, wherein upon closing the locking valve, the virtual articulated front axle behaves as a virtual locked front axle.

19. A vehicle according to claim 14, wherein the locking valves comprise spool valves biased to a closed position when not actuated.

20. A method for leveling a vehicle, the vehicle having a chassis, a first wheel and an associated first telescoping hydraulic cylinder supporting the chassis, a second wheel and an associated second telescoping hydraulic cylinder supporting the chassis, a third wheel and an associated third telescoping hydraulic cylinder supporting the chassis, and a fourth wheel and an associated fourth telescoping hydraulic cylinder supporting the chassis; the first and second wheels defining a first set of wheels, the third and fourth wheels defining a second set of wheels; the method comprising:
- providing a valve arrangement providing for extending and retracting the first, second, third and fourth cylinders; wherein the first and third hydraulic cylinders are fluidly connected and extend and retract together to level the vehicle; and wherein the second and fourth hydraulic cylinders are fluidly connected and extend and retract together to level the vehicle; wherein the first and second cylinders are fluidly connected and extension of one of the first or second cylinders retracts the other of the first and second cylinders to simulate a floating axle in a first mode; and
- determining whether there is a predetermined weight on third or fourth wheels, and if there is not a predetermined weight on one of the wheels, closing fluid flow between the first and second cylinders.

21. A method according to claim 20, wherein the valve arrangement comprises a spool valve.

22. A method according to claim 21, wherein the determining comprises comparing whether the weight on one of the third or fourth wheels is less than the weight on the first and second wheels.

23. A method according to claim 20, comprising extending and retracting the first and third cylinders independently of the second and fourth cylinders.

24. A method according to claim 20, wherein upon closing the locking valve, the virtual articulated front axle behaves as a virtual locked front axle.

25. A method according to claim 20, wherein the valve arrangement creates a virtual floating axle between the first and second cylinders create when the valve arrangement is actuated and wherein the valve arrangement creates a virtual locked axle between the first and second cylinders when the valve arrangement is unactuated.

* * * * *